3,322,799
PROCESS FOR PREPARING MOLYBDENUM CARBONYL COMPLEXES
Thomas H. Coffield and Robert P. M. Werner, Farmington, Mich., assignors to Ethyl Corporation, New York, N.Y., a corporation of Virginia
No Drawing. Filed Aug. 22, 1961, Ser. No. 133,027
4 Claims. (Cl. 260—429)

This application is a continuation-in-part of application Ser. No. 834,929, filed Aug. 20, 1959, now U.S. 3,124,600, and application Ser. No. 78,844, filed Dec. 28, 1960, now abandoned.

This invention relates to novel organometallic compounds and methods for their preparation. More particularly, this invention relates to organometallic compounds in which a saturated ether or saturated thioether is bonded to molybdenum through a sulfur or oxygen linkage.

An object of this invention is to provide a process for the preparation of molybdenum tricarbonyl complexes which contain a donor molecule. A further object is to provide a novel process for the preparation of organometallic compounds which contain a donor molecule selected from the class consisting of ammonia, primary, secondary, and tertiary amines, nitriles, phosphines, arsines, and stibines, and a molybdenum tricarbonyl moiety. Additional objects will be apparent from the following detailed discussion and appended claims.

The above objects are accomplished by providing a process for the preparation of organometallic complexes of molybdenum, said process comprising reacting a donor molecule selected from the class consisting of ammonia, primary, secondary, and tertiary amines, nitriles, phosphines, arsines, and stibines, with a compound having the formula P′Mo(CO)$_3$ wherein P′ is selected from the group consisting of saturated tridentate ethers and tridentate thioethers, and P′ is bonded to the molybdenum atom through a linkage selected from the class consisting of sulfur and oxygen atoms. The ether reactants employed in this process are described and claimed in our parent patent U.S. 3,124,600, supra.

The donor molecules within the products produced by the process of this invention are bonded to the molybdenum atom by virtue of the donation of electrons from the Group V–A elements within the donor molecules to the molybdenum. (The Group V–A elements within the donor molecules are selected from the group consisting of nitrogen, phosphorus, arsenic, and antimony.) In a highly preferred embodiment, the donor molecules contain either one or three atoms of the Group V–A elements mentioned above. Since the molybdenum atoms within the compounds of this invention have the electronic configuration of xenon, the highly preferred products produced by the process of this invention fall into two categories.

In the first category are the compounds derived from donor molecules having one atom of a Group V–A element. These compounds consist of three donor molecules, one molybdenum atom, and three carbonyl groups. The second type of compounds are derived from donor molecules containing three Group V–A element atoms. These compounds consist of one donor molecule, one molybdenum atom, and three carbonyl groups.

Thus, the products produced by the process of this invention are selected from (I) compounds having the formula T$_3$Mo(CO)$_3$ wherein T is a donor molecule selected from the class consisting of ammonia, primary, secondary, and tertiary amines, nitriles, phosphines, arsines, and stibines, said donor molecule having one atom of a Group V–A element selected from the group consisting of nitrogen, phosphorus, arsenic, and antimony; and (II) compounds having the formula T′Mo(CO)$_3$ wherein T′ is a donor molecule selected from the class consisting of primary, secondary, and tertiary amines, nitriles, phosphines, arsines, and stibines, said donor molecule having three atoms of a Group V–A element selected from the group consisting of nitrogen, phosphorus, arsenic, and antimony.

Because donor molecules having one atom of the Group V–A elements mentioned above are more readily available, these compounds are the preferred reactants in the process of this invention. Similarly, donor molecules having three Group V–A elements such as diethylene triamine, which are readily available, are also preferred reactants. Thus, a preferred embodiment of this invention comprises a process for the preparation of molybdenum complexes, said process comprising reacting a complexing agent selected from the class consisting of diethylene triamine and donor molecules having one Group V–A element selected from the group consisting of nitrogen, phosphorus, arsenic, and antimony, said donor group being selected from the class consisting of ammonia, primary, secondary, and tertiary amines, nitriles, phosphines, arsines, and stibines, with a compound having the formula P′Mo(CO)$_3$ wherein P′ is selected from the group consisting of saturated tridentate ethers and tridentate thioethers, and P′ is bonded to the molybdenum atom through a linkage selected from the class consisting of sulfur and oxygen atoms. In a most preferred embodiment, alkyl, cycloalkyl, aryl, and heterocyclic amines, nitriles, phosphines, arsines, and stibines are employed.

Examples I–IX which follow illustrate the preparation of ether compounds which are used as starting materials in the process of this invention. Examples X–XIV illustrate the novel process of this invention but do not limit it. All parts are parts by weight unless otherwise noted.

*Example I*

A solution comprising five moles of molybdenum hexacarbonyl in a mixture of 15 moles of benzene and 28.2 moles of diethyleneglycol dimethylether was refluxed in an atmosphere of nitrogen for four hours at 120° C. The hot solution was then filtered in the absence of air. On cooling of the clear, deep yellow-brown filtrate, a precipitate formed. The precipitate was washed repeatedly with petroleum ether and was dried under vacuum. There was obtained a greenish-yellow crystalline solid which was 2,5,8-trioxanonane molybdenum tricarbonyl. This material is soluble in both methanol and water and exhibits bands in the infrared spectrum at 3.0, 3.45, 5.25 and 5.44 microns. The compound analyzed for 35.1 percent carbon, 4.7 percent hydrogen and 30.9 percent molybdenum. This corresponds to the calculated analysis for 2,5,8-trioxanonane molybdenum tricarbonyl (C$_9$H$_{14}$MoO$_6$): C, 34.41; H, 4.46 and Mo, 30.55.

*Example II*

Three parts of benzene molybdenum tricarbonyl were heated with 15 parts of diethyleneglycol dibutylether under an atmosphere of nitrogen. The temperature of the mixture was maintained at 150° C. for about 30 minutes during which time the liberated benzene was removed. Then, filter aid (Celite) was added, and the mixture was filtered hot under nitrogen pressure. Cooling of the dark filtrate with the slow addition of petroleum ether gave a grey-brown crystalline precipitate (5,8,11-trioxapentadecane molybdenum tricarbonyl) which was washed with petroleum ether and dried. It was air sensitive and had to be kept under a blanket of protective gas. Its analysis corresponded to the calculated value for 5,8,11-trioxapentadecane molybdenum tricarbonyl.

*Example III*

The procedure of Example I was repeated using as reactants a mixture of 11.4 moles of molybdenum hexacarbonyl, 70.4 moles of purified diethyleneglycol dimethylether and 33 moles of benzene. The diethyleneglycol dimethylether which was used had been purified by distilling it over sodiobenzophenone. The reaction mixture was refluxed for seven hours under a protective blanket of nitrogen. It was then filtered to remove any solids, and the filtrate was cooled. On cooling, a crystalline precipitate was obtained. This precipitate was extracted with petroleum ether, and the precipitate was then subjected to vacuum sublimation. There were recovered 3.8 moles of unreacted molybdenum hexacarbonyl and 5.6 moles of the product 2,5,8-trioxanonane molybdenum tricarbonyl. This corresponded to a 74 percent yield of product based on the amount of molybdenum hexacarbonyl consumed in the reaction. Its analysis was the same as that of the product in Example I.

*Example IV*

One and thirty-four hundredths moles of 2,5,8-trioxanonane molybdenum tricarbonyl was mixed with 20 moles of tetrahydrofuran whereupon the solution attained a deep red-brown color. Slow addition of petroleum ether to the stirred solution precipitated olive-brown crystals which were filtered and washed with petroleum ether. This operation was repeated four times in order to rid the crystalline product of diethyleneglycol dimethylether. The crystals were then dried to give 1.11 moles of tris-tetrahydrofuran molybdenum tricarbonyl (83 percent yield). The material was water soluble and air sensitive. On decomposition of the compound, tetrahydrofuran was liberated. The molybdenum analysis was 25.8 percent which was somewhat higher than the 24.2 percent calculated value. This resulted from slight decomposition of the compound during the analytical procedure. Processes similar to that of Example IV can be utilized in forming compounds of our invention. For example, when 2,5,8-trioxanonane molybdenum tricarbonyl is reacted with hexaethyleneglycol dimethylether, the compound 2,5,8,11,14,17,20-heptaoxa - n - heneicosane bis(molybdenum tricarbonyl) is formed. Similarly, the reaction between 2,5,8-trioxanonane molybdenum tricarbonyl and 1-dimethylarsine-2-(1,3-dioxabutyl)cyclohexane in a dimethylformamide solvent, forms the compound 1-dimethylarsine-2-(1,3-dioxabutyl)cyclohexane molybdenum tricarbonyl. Similarly, the reaction between 2,5,8-trioxanonane molybdenum tricarbonyl and β,β'-thiodipropionitrile forms β,β'-thiodipropionitrile molybdenum tricarbonyl.

*Example V*

One mole of 2,5,8-trioxanonane molybdenum tricarbonyl is heated with 8 moles of ethyleneglycol dimethylether. After holding the reaction mixture at a temperature of 50° C. for one hour, the reaction vessel is discharged. The reaction mixture is filtered. After addition of petroleum ether to the filtrate a precipitate forms of a dimethoxyethane molybdenum tricarbonyl.

*Example VI*

A mixture comprising one mole of molybdenum hexacarbonyl and five moles of 1,2-diethoxycyclohexane in 10 moles of n-octane is refluxed for 14 hours. On cooling, 1,2-diethoxycyclohexane molybdenum tetracarbonyl is obtained after triturating the somewhat smeary precipitate with ether.

*Example VII*

One mole of anisole molybdenum tricarbonyl and 10 moles of diethyleneglycol dimethylether are heated to about 70° C. under a vacuum of 40 millimeters. On workup of the reaction mixture, there is obtained a good yield of 2,5,8-trioxanonane molybdenum tricarbonyl.

*Example XIII*

One mole of molybdenum hexacarbonyl and 10 moles of diethyleneglycol dimethylether and 5 moles of octyl benzene are heated at a temperature of 140° to 160° C. for 6 hours. On cooling, following by filtration, there is obtained a good yield of 2,5,8-trioxanonane molybdenum tricarbonyl.

*Example IX*

One mole of tris(tetrahydrofuran) molybdenum tricarbonyl and 1½ moles of morpholinoethyl ethyl ether in 10 moles of n-hexane are heated at reflux for 4 hours. On cooling and workup of the reaction mixture, there is obtained ω-ethoxy(N-ethylmorpholine)molybdenum tricarbonyl.

The compounds of this invention find their main application as intermediates in the preparation of other useful organometallic compounds. They react readily with donor compounds having donor properties superior to the ether and thioether compounds such as ammonia, primary-, secondary-, and tertiary-amines and nitriles, phosphines, arsines, stibines and pyridines through displacement of the ether moiety to form many new and useful organometallic compounds. Typical of these compounds are triammonia molybdenum tricarbonyl, diethylenetriamine molybdenum tricarbonyl, tripyridine molybdenum tricarbonyl, tris(triphenylphosphine)molybdenum tricarbonyl, tris(triphenylarsine)molybdenum tricarbonyl and tris(triphenylstibine)molybdenum tricarbonyl. The following is an example of such a reaction.

*Example X*

One part of diethylene glycol dimethyl ether molybdenum tricarbonyl is dissolved in 10 parts of diethylenetriamine. Slow addition of ether produced a light-yellow crystalline precipitate which was washed with ether and dried to yield the compound, diethylenetriamine molybdenum tricarbonyl. This material was water insoluble and had an analysis of 32.7 percent molybdenum and 14.8 percent nitrogen. Calculated for $C_7H_{13}MoO_3N_3$ was Mo, 33.87, and N, 14.84. Its infrared spectrum showed bands at 5.3 and 5.8 microns.

Other molybdenum complexes can be formed from the ether and thioether molybdenum tricarbonyl compounds disclosed in this invention by mixing aqueous or alcoholic solutions of the ether and thioether complexes and the displacing donor compound. The following example illustrates this procedure.

*Example XI*

In a suitable reaction vessel one part of 2,5,8-trioxanonane molybdenum tricarbonyl was dissolved in 8 parts of methanol. This solution was added slowly to a stirred solution of one part of o-phenanthroline in 16 parts of methanol. Immediately, sparkling, deep purple crystals of tris(o-phenanthroline)molybdenum tricarbonyl precipitated. These crystals were washed with methanol, ether, petroleum ether and dried, yield 90.4 percent. The crystals turned brown in air. Calculated for

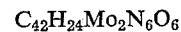

C, 56.02; H, 2.69. Found: C, 47.0; H, 3.52.

Other products which were prepared by using the above technique are listed in the following table.

TABLE I

| Product | Reactant | Ligand | Solvent |
|---|---|---|---|
| $(NH_3)_3Mo(CO)_3$ | $DMCMo(CO)_3$ | Ammonia | Water. |
| $(C_4H_{13}N_3)Mo(CO)_3$ | $DMCMo(CO)_3$ | Diethylenetriamine | Do. |
| $(C_9H_{23}N_3)Mo(CO)_3$ | $DMCMo(CO)_3$ | Pentamethyldiethylenetriamine | Methanol. |
| $(CH_3CN)_3Mo(CO)_3$ | $DMCMo(CO)_3$ | Acetonitrile | Water. |
| $(C_5H_5N)_3Mo(CO)_3$ | $DMCMo(CO)_3$ | Pyridine | Do. |

DMC = Dimethyl "Carbitol."

Tris(octadecylamine)molybdenum tricarbonyl, tris(triphenylphosphine)molybdenum tricarbonyl, tris(triphenylstibine)molybdenum tricarbonyl, tris(triphenylarsine)molybdenum tricarbonyl and tris(2,2'-dipyridylamine)molybdenum tricarbonyl are prepared using the same technique.

The type of reaction exemplified in the last example is generally carried out at atmospheric pressure. However, pressures as low as 0.1 of an atmosphere and as high as 150 atmospheres can be used. The temperature range employed for this type of reaction is about −30 to about 80° C. The temperature range is governed by the choice of solvent and by the pressure employed. Generally, we prefer to use a temperature of about −30 to about 80° C. We prefer to use temperatures from about −5° to about 50° C. The process is practically instantaneous when the product is insoluble as in the previous example. Precipitation is usually enhanced by use of a lower temperature. Products that exhibit some solubility at room temperature can be obtained in higher yield if lower temperatures are used. Stirring the reaction mixture facilitates the process, since homogenous reaction media favors enhancing the rate of reaction. Stirring is not essential, however. When mixing the two solutions, usually one reactant is added in a fine stream to the solution of the other reactant. We prefer this slow addition since purer, more crystalline products are obtained. However, dropwise addition and very rapid mixing are applicable. We prefer to allow the reaction mixture to stand for some time after mixing to insure complete precipitation. The total time expended for mixing and allowing the product to completely precipitate is from about two minutes to about two hours. A preferred time is from about 15 minutes to about 1½ hours. A hydrolytic solvent which is non-reactive toward the reactants and products can be employed. Isopropanol n-butanol, sec-butanol, isobutanol and tertiary butanol and ethylene glycol are examples of this type of solvent. Water, methanol and ethanol are preferred solvents for this process. The choice of solvent is governed by the temperature and pressure employed and the solubility of the products and the reactants. However, this process is not limited to reactions wherein the product is insoluble in the solvent employed. Soluble products can be obtained. The following example exemplifies this variation.

*Example XII*

Into a suitable reaction vessel 31.4 parts of dimethyl Carbitol molybdenum tricarbonyl in 50 parts of methanol is added with stirring to 14.6 parts of triethylene tetraamine dissolved in 50 parts of methanol. Stirring is continued for one-half hour. No precipitate is obtained. The solvent is stripped from the reaction mixture at reduced pressure and room temperature. The resulting solid is then triturated with a small amount of ice cold diethyl-ether and then dried in vacuo. The product is triethylene tetraamine tricarbonyl molybdenum.

When preparing a product soluble in the solvent employed, the same temperature and pressure ranges employed for preparation of an insoluble product are utilized. Generally, the reaction time is longer, in the order of 25 minutes to about 12 hours. We prefer to use a reaction time ranging from 30 minutes to 10 hours. Isolation steps analogous to those given in the preceding example are applicable. The products can also be isolated from the reaction mixture by other common processes. Such methods as distillation, extraction, chromatography and the like can be used. To facilitate the isolation of the product we prefer to use equi-molar amounts of the two reactants.

An excess of a reactant can be employed if that reactant is readily removable by one of the above techniques. When an excess of a reactant is employed we prefer to use the minimum excess which will drive the reaction nearly to completion. When using this technique, a molar ratio of about 1.1 to about 100 can be used. We prefer to use a ratio of about 1.2 to about 10.

Important variations of the above displacement technique are possible. The reaction can be carried out in the absence of solvent. When an excess of donor compound is used to dissolve the ether or thioether molybdenum carbonyl complex, two variations are possible. The product may be insoluble in the reaction mixture or it may be soluble therein. When the product is soluble it may be precipitated by the addition of solvent. The following examples illustrate the two variations.

*Example XIII*

In the absence of solvent an instantaneous reaction followed upon addition of excess, cold (−20° C.) dimethylamine to 4.9 parts of 2,5,8-trioxanone $Mo(CO)_3$. The colorless crystalline solid was only slightly soluble in the amine at its boiling point (6° C.). The solid was filtered, washed with dimethylamine and petroleum ether, and dried under vacuum. The yield was 90 percent. The product tris(dimethylamine)molybdenum tricarbonyl was fairly stable in air, soluble in acetone, methanol and water. The infrared spectrum exhibited bands at 3.0, 3.4, 5.2, 5.3, 5.6, 5.7, 5.85, and 6.8 microns.

*Analysis.*—Calculated for $C_9H_{21}MoN_3O_3$: C, 34.29; H, 6.71; N, 13.33. Found: C, 34.0; H, 6.78; N, 13.0.

*Example XIV*

One part of 2,5,8-trioxanone molybdenum tricarbonyl was dissolved in 10 parts of acrylonitrile. Slow addition of petroleum ether to the clear orange solution precipitated a solid material. Trituration of this material with additional petroleum ether yielded an orange crystalline product tris(acrylonitrile) molybdenum tricarbonyl.

*Analysis.*—Calculated for $C_{12}H_8MoH_3O_3$: C, 42.5; H, 2.67; Mo, 128.3. Found: C, 40.7; H, 3.0; Mo, 32.0.

Generally, the above two modifications are run at atmospheric pressure. However, pressures as low as .10 and as high as 150 atmospheres can be utilized. The temperature range for these modifications is from about −50° to about +50° C. A preferred temperature range is from about −30° to about +30° C. When the product is precipitated by the addition of a solvent, the nature of the solvent employed is governed by two considerations. The product must be insoluble in this solvent and the solvent must be miscible with the reaction mixture. Examples of such solvents are ether, petroleum ether and the like. We prefer to add the solvent slowly, with agitation, in order to obtain a more crystalline product. After no more precipitate appears, the addition of solvent is discontinued. The reaction time is governed by consideration of whether a soluble or insoluble product is formed. When an insoluble product is formed, the reaction times are generally quite short. We prefer to use a reaction time of about 20 minutes to about 2 hours, to insure complete precipitation. When the product is soluble, a longer reaction time is employed in order to obtain the product in optimum yield. We prefer to use a reaction time of about 30 minutes to about 10 hours.

Other products which were isolated using the techniques taught in the immediately prior examples are listed in the table below.

TABLE 2

| Product | Reactant | Ligand | Solvent |
| --- | --- | --- | --- |
| $(C_4H_{13}N_3)Mo(CO)_3$ | $DMCMo(CO)_3$ | Diethylenetriamine | None. |
| $(CH_2=CH—CH_2CN)_3Mo(CO)_3$ | $DMCMo(CO)_3$ | Allylcyanide | Do. |
| $(C_6H_5CN)_3Mo(CO)_3$ | $DMCMo(CO)_3$ | Benzonitrile | Do. |
| $(C_5H_5N)_3Mo(CO)_3$ | $DMCMo(CO)_3$ | Pyridine | Do. |
| $(C_4H_8O)_3Mo(CO)_3$ | $DMCMo(CO)_3$ | Tetrahydrofuran | Do. |

DMC=Dimethyl "Carbitol."

These new compounds which may be formed from our ether compounds are useful antiknocks when added to a petroleum hydrocarbon. Further, they may be used as supplemental antiknocks, that is, in addition to a lead antiknock already present in the fuel. Typical lead antiknocks are the lead alkyls such as tetraethyllead, tetrabutyllead, tetramethyllead and various mixed alkyls such as dimethyldiethyllead, diethyldibutyllead and the like. When used as an antiknock, these compounds may be present in the gasoline in combination with typical halogen scavengers such as ethylene dichloride, ethylene dibromide and the like.

Our ether compounds are not only useful intermediates as shown above but are further useful in their own right in metal plating applications. In order to effect metal plating with our novel compounds, they are decomposed in an evacuated space containing the object to be plated. On decomposition, they lay down a film of metal on the object contained within the enclosure. The gaseous plating may be carried out in the presence of an inert gas so as to prevent oxidation of the metal during the plating operation.

The gaseous plating technique described above finds wide application in forming coatings which are not only decorative but also protect the underlying substrate material. Since molybdenum is a conductor, this technique enables the preparation of printed circuits which find wide application in the electrical arts.

Deposition of metal on a glass cloth illustrates the applied processes. A glass cloth band weighing one gram is dried for one hour in an oven at 150° C. and then dipped in one of our compounds. It is then placed in a tube which is devoid of air. The tube is heated at 400° C. for one hour after which time the tube is cooled and opened. The cloth has a uniform metallic grey appearance and exhibits a gain in weight of about 0.02 gram. The cloth has greatly decreased resistivity and each individual fiber proves to be a conductor. An application of current to the cloth causes an increase in its temperature. Thus, a conducting cloth is prepared. This cloth can be used to reduce static electricity, for decoration, for thermal insulation by reflection and as a heating element.

Our compounds also find utility as additives for lubricating oils and greases to increase their antiwear activity. They are also used to control the rate of combustion of pyrophoric materials such as solid rocket propellants. Our compounds are also biocidally active and find utility as fungicides, herbicides, pesticides, and the like.

Having fully described our novel compounds, their mode of preparation and their manifold utilities, we desire to be limited only within the scope of the appended claims.

We claim:
1. A process for the preparation of organometallic complexes of molybdenum, said process comprising reacting a donor molecule selected from the class consisting of ammonia, alkyl, cycloalkyl, aryl, and heterocyclic primary, secondary, and tertiary amines, nitriles, triphenylphosphine, triphenylarsine, and triphenylstibine with a compound having the formula $P'Mo(CO)_3$ wherein P' is a saturated tridentate ether, and P' is bonded to the molybdenum atom through an oxygen linkage.

2. The process of claim 1 wherein a hydrolytic solvent selected from the class consisting of water and aliphatic alcohols having up to five carbon atoms is employed.

3. The process of claim 2 wherein said solvent is methanol.

4. A process for the preparation of molybdenum complexes, said process comprising reacting a complexing agent selected from the class consisting of diethylene triamine and donor molecules having one Group V–A element selected from the group consisting of nitrogen, phosphorus, arsenic, and antimony, said donor molecule being selected from the group consisting of ammonia, alkyl, cycloalkyl, aryl, and heterocyclic primary, secondary, and tertiary amines, nitriles, triphenylphosphine, triphenylarsine, and triphenylstibine, with a compound having the formula $P'Mo(CO)_3$ wherein P' is a saturated tridentate ether, and P' is bonded to the molybdenum atom through an oxygen linkage.

References Cited

UNITED STATES PATENTS 3,065,250    11/1962    Levering _____ 260—429

OTHER REFERENCES

Abel et al.: J. Chem. Soc., page 4559 (1958).

Coates: "Organo-Metallic Compounds," John Wiley and Sons, Inc. (1960) pages 136 and 137.

Matthews et al.: J. Am. Chem. Soc., page 2273, May 5, 1959.

TOBIAS E. LEVOW, Primary Examiner.

W. J. VAN BALEN, T. L. IAPALUCCI, A. P. DEMERS, Assistant Examiners.

UNITED STATES PATENT OFFICE
CERTIFICATE OF CORRECTION

Patent No. 3,322,799            May 30, 1967

Thomas H. Coffield et al.

It is hereby certified that error appears in the above numbered patent requiring correction and that the said Letters Patent should read as corrected below.

Column 6, lines 38 and 51, for "trioxanone", each occurrenc read -- trioxanonane --.

Signed and sealed this 28th day of November 1967.

(SEAL)
Attest:

Edward M. Fletcher, Jr.

Attesting Officer

EDWARD J. BRENNER

Commissioner of Patents